United States Patent [19]

Bekkedahl

[11] Patent Number: 5,755,368
[45] Date of Patent: May 26, 1998

[54] LIQUID DISPENSING APPARATUS FOR BICYCLISTS AND SKATERS

[76] Inventor: James Bekkedahl, 13712 Loretta Dr., Tustin, Calif. 92680

[21] Appl. No.: 661,786

[22] Filed: Jun. 13, 1996

[51] Int. Cl.[6] .................................................. B62J 11/00
[52] U.S. Cl. ........................ 224/414; 224/148.2; 222/610; 222/175
[58] Field of Search ........................ 224/148.1, 148.2, 224/148.5, 148.6, 414, 461; 248/102, 103, 105; 215/386, 387, 388, 391, 399, 400; 24/3.13; 222/175, 610, 628

[56] References Cited

U.S. PATENT DOCUMENTS

| | | | |
|---|---|---|---|
| 1,058,229 | 4/1913 | Futhey | 224/461 |
| 3,840,153 | 10/1974 | Devlin | 224/414 |
| 4,095,812 | 6/1978 | Rowe | 224/414 |
| 4,420,097 | 12/1983 | Motsenbocker | 224/148.2 |
| 4,765,037 | 8/1988 | Perry | 24/3.13 |
| 4,807,813 | 2/1989 | Coleman | 244/414 |
| 4,911,339 | 3/1990 | Cushing | 224/414 |
| 5,062,591 | 11/1991 | Runkel | 224/148.5 |
| 5,150,504 | 9/1992 | Cohen | 24/3.13 |
| 5,215,231 | 6/1993 | Paczonay | 224/414 |
| 5,265,769 | 11/1993 | Wilson | 224/175 |
| 5,301,858 | 4/1994 | Hollander | 224/414 |
| 5,326,124 | 7/1994 | Allemang | 222/610 |
| 5,607,087 | 3/1997 | Wery et al. | 222/610 |
| 5,645,404 | 7/1997 | Zelanak | 224/414 |

*Primary Examiner*—Henry J. Recla
*Assistant Examiner*—Gregory M. Vidovich
*Attorney, Agent, or Firm*—Howard A. Kenyon

[57] ABSTRACT

A liquid dispensing apparatus installed on a bicycle for use by a person operating the bicycle or a liquid dispensing apparatus installed on a person for use by a person operating inline skates is described. In the preferred embodiment a carbonated drink in a container is shaken by the bouncing of the bicycle while moving which pressurizes the container. A tube leading from the container to a mouthpiece allows a person to take a drink. Another embodiment provides a pumping bulb to supply the pressure while a third embodiment uses a $CO_2$ cartridge to supply the pressure. Another installation shows a person using inline skates. The inline skate installation uses a carbonated drink in a container being shaken by the skater to supply the pressure which forces the liquid to the mouthpiece thereby allowing a person using inline skates to take a drink.

2 Claims, 2 Drawing Sheets

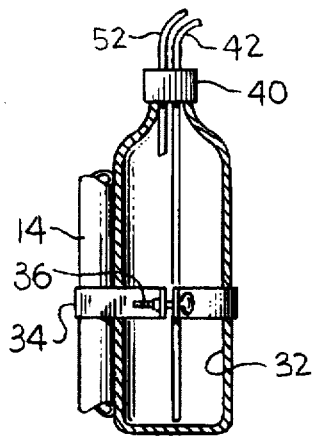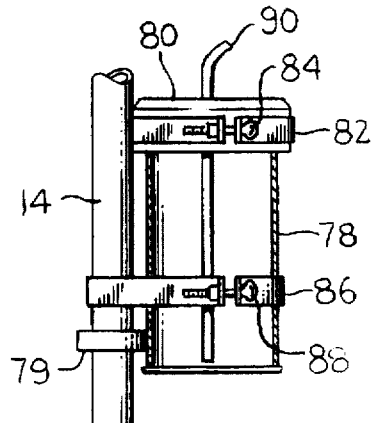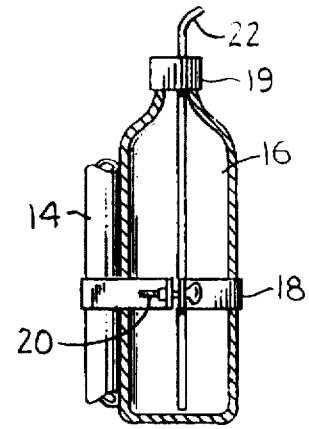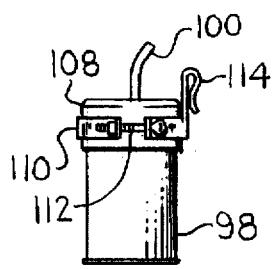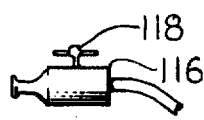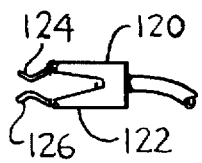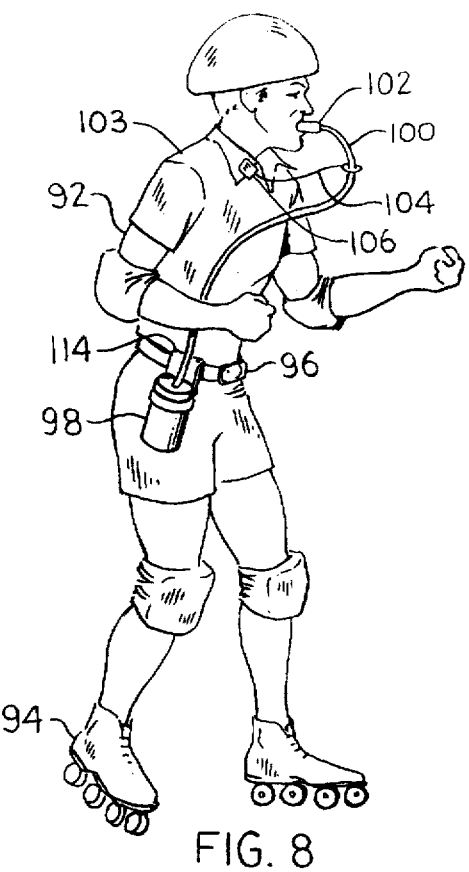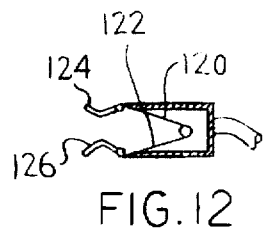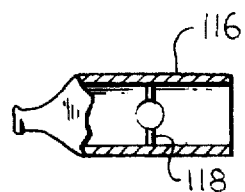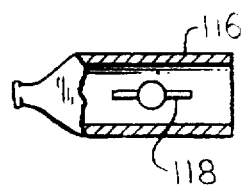

LIQUID DISPENSING APPARATUS FOR BICYCLISTS AND SKATERS

BACKGROUND OF THE INVENTION

1. Field of the Invention

This invention relates to a liquid dispensing apparatus for use by a person operating a bicycle or inline skates. More specifically, this invention utilizes a carbonated drink being shaken to provide pressure in one embodiment and a hand bulb pump and a $co_2$ cartridge to provide pressure in other embodiments.

2. Description of the Prior Art

A person riding a bicycle or inline skates any distance will become dehydrated and the physical exertion requires body fluids to be replenished. It is well known in the art to mount a water bottle to the frame of a bicycle which is periodically removed by the rider for drinking. Many times it is inconvenient to stop and take a drink from a container strapped to a bicycle frame or carried by a person.

There have been attempts to provide a rider with liquids while continuing to ride a bicycle. One such attempt is found in U.S. Pat. No. 4,911,399 to Cushing. Cushing provides a bellows pump attached to the end of a container with tubing from the container to the handlebars and a hand operated valve on the handlebars. Cushing does not give a rider a drink but forces a stream of liquid from a nozzle on the handlebars toward the rider's mouth in a spray. U.S. Pat. No. 4,095,812 and 4,274,566 to Rowe both contain reels of tubing that are connected to a liquid container on one end and a mouth piece on the other end. In both the patents suction is required by the rider to drink water or other liquids while riding. The present invention requires no suction by the rider. Another attempt to supply fluid to a bicycle rider is U.S. Pat. No. 5,143,390 to Goldsmith who pressurizes a bicycle frame or tank attached to a bicycle frame and through pressure regulating pressurizes a bladder in a container containing fluid. The fluid is valved to a nozzle attached to the handlebars and is sprayed toward the rider's mouth. Another attempt to supply fluid to a bicycle rider is U.S. Pat. No. 5,326,124 to Allemang who has a manually operated pump having a piston, drawing water from a water bottle strapped to the bicycle frame and having two methods of discharging fluid to the rider. One method of discharging fluid is spraying over the rider's body to keep him cool and the other is through a mouthpiece. The rider must continually pump while fluid is supplied All of the above attempts do not provide a pressurized container forcing fluid up to the rider's mouth controlled by valving means. What is needed is an apparatus that will supply pressurized fluid to a rider's mouth for an extended period of time. Accordingly, a fuller understanding of the invention may be obtained by referring to the Summary of the Invention, and the Detailed Description of the Preferred Embodiment, in addition, to the scope of the invention defined by the claims taken in conjunction with the accompanying drawings.

SUMMARY OF THE INVENTION

It is the object of the present invention to provide a drinking apparatus for a person riding a bicycle or using inline skates.

It is another object of the present invention to provide a drinking apparatus that pressurizes a container containing liquid for an extended period of time.

It is yet another object of the present invention to provide a drinking apparatus that will deliver liquid to a mouthpiece.

It is still another object of the present invention to provide a drinking apparatus that is controlled by valving at the mouthpiece.

Briefly, in accordance with the present invention, there is provided a container having potable liquid, means for pressurizing the liquid by shaking a carbonated drink, a hand pump or a $co_2$ cartridge for non-carbonated drinks. The pressurized liquid is forced to the mouthpiece where the amount of liquid to be consumed is controlled by a hand operated valve or a valve controlled by biting on the mouthpiece.

Other objects and advantages will become apparent from the following description and appended claims taken in conjunction with the accompanying drawings.

DESCRIPTION OF THE DRAWINGS

In the drawings which illustrate the best mode contemplated for carrying out the present invention:

FIG. 5 is a partial cutaway view of a container for a carbonated drink.

FIG. 6 is a partial cutaway view of a container for a non-carbonated drink.

FIG. 7 is a partial cutaway view of a "soda pop" can containing a carbonated drink.

FIG. 8 is a side view of a person wearing inline skates showing the drinking apparatus for a carbonated drink.

FIG. 9 is a partial cutaway view of a container designed to fit on the belt on an inline skater.

FIG. 10 is a side view of a mouthpiece showing a hand operated valve.

FIG. 11 is a partial cutaway side view of a mouthpiece showing a bite valve in a closed position.

FIG. 12 is a partial cutaway side view of a mouthpiece showing a bite valve in an open position.

FIG. 13 is an internal view of the valve of FIG. 10 in a closed position.

FIG. 14 is an internal view of the valve of FIG. 10 in an open position.

These and other objects, features and advantages of the present invention will become more readily apparent upon detailed consideration of the following Description of the Preferred Embodiments with reference to the accompanying claims.

DESCRIPTION OF THE PREFERRED EMBODIMENT

Figure 1:
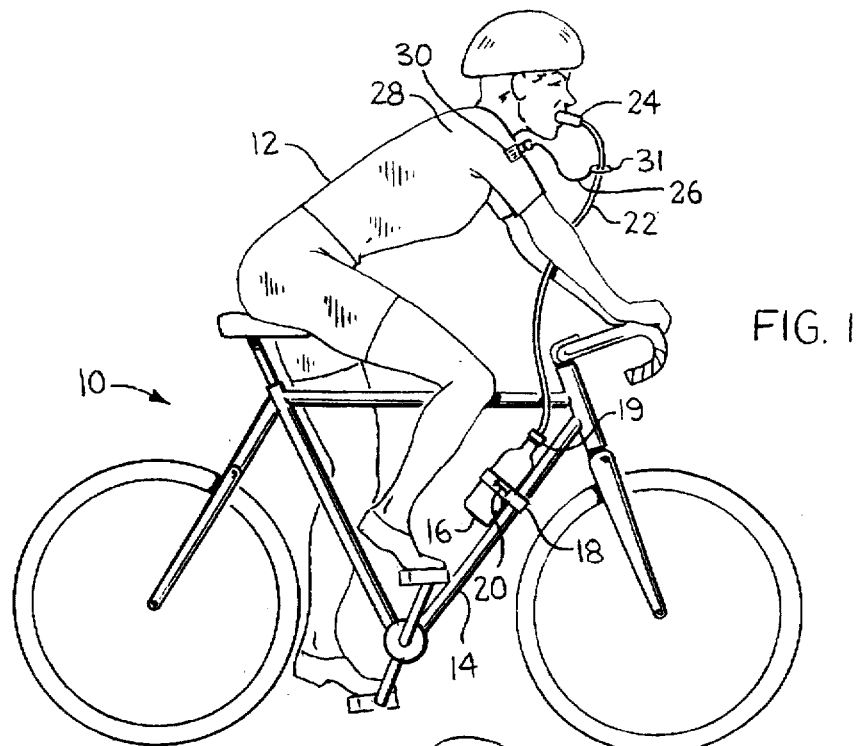
FIG. 1 is a side view of a bicycle and rider showing the drinking apparatus for a carbonated drink.

Referring now to FIG. 1 there is seen a side view of a bicycle 10 and a rider 12. Attached to the bicycle frame 14 is a cylindrical container 16 held on by a band 18 where the band 18 is tightened by a clamp 20. Cylindrical container 16 has a twist off cap 19 and container 16 is filled with a carbonated potable liquid. The rider 12 moving the bicycle 10 over a surface (not shown) provides sufficient vibration that will shake the container 16 and create a gas and also a pressure inside the container 16. A potable liquid delivery tube 22 sealed at the twist off cap 19 extends from the twist off cap 19 to a mouth piece 24. An attachment line 26 allows the mouthpiece 24 to be conveniently available to the rider 12 when the mouthpiece 24 is not in the rider's mouth. Attachment line 26 is held on to the rider's clothing 28 by a spring biased clamp 30. Attachment line 26 is looped around potable liquid delivery tube 22 at 31 to allow attachment line 26 to move up and down on delivery tube 22.

Figure 3:
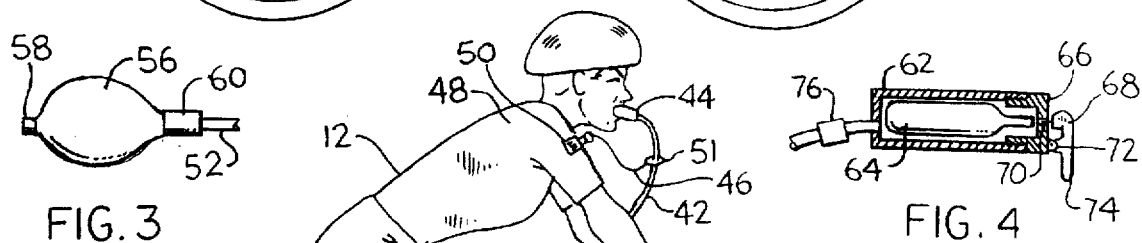
FIG. 3 is a view of a bulb used to supply pressure.
Figure 4:
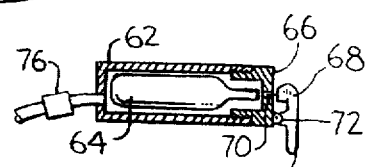
FIG. 4 is a side partial cutaway view of a $co_2$ device to supply pressure.
Figure 2:
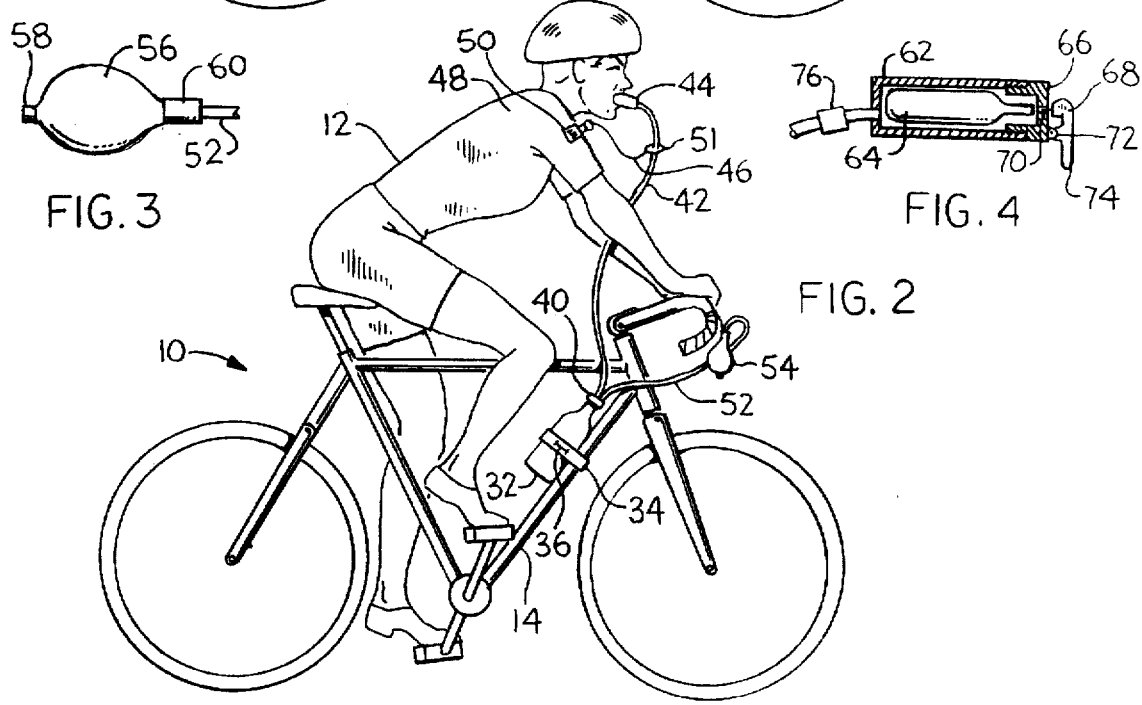
FIG. 2 is a side view of a bicycle and rider showing the drinking apparatus for a non-carbonated drink.

Referring now to FIG. 2 there is seen a side view of a bicycle 10 and a rider 12. Attached to the bicycle frame 14 is a cylindrical container 32 held on by band 34 where the band 34 is tightened by an clamp 36. Cylindrical container 32 has a twist off cap 40 and container 32 is filled with a non-carbonated potable liquid. A potable liquid delivery tube 42 sealed at the twist off cap 40 extends from the twist off cap 40 to the mouthpiece 44. A pressure tube 52 also sealed at the twist off cap 40 extends from the twist off cap 40 to pressure means 54 attached to the mid-portion of the handle bars (not shown). An attachment line 46 allows the mouthpiece 44 to be conveniently available when the mouthpiece 44 is not in the rider's mouth. Attachment line 46 is held on to the riders clothing 48 by a spring biased clamp 50. Attachment line 46 is looped around potable liquid delivery tube 42 at 51 to allow attachment line 46 to move up and down on delivery tube 42. The pressure means 54 a as shown in FIG. 2 is a bulb in one case as shown in FIG. 3 and in another case pressure means is a $CO_2$ cartridge as shown in FIG. 4. The pressure means 54 shown in FIG. 3 is a flexible bulb 56 with check valve 58 in one end and a check valve 60 in the other end. The bulb 56 is attached to the center portion of the handlebars (not shown) preferably by a clamp (not shown). When the bulb 56 is compressed the check valve 58 closes and the check valve 60 opens allowing pressure to enter line 52. When the bulb is expanded, check valve 60 is closed and check valve 58 is opened to allow the bulb 56 to expand and fill with air. The pressure means as shown in FIG. 4 is a cylinder 62 containing a $CO_2$ cartridge 64. Container 62 has a sealable screw on cap 66 with a piercing device 68. The piercing device 68 has a needle 70 sealed in cap 68. The piercing device 68 rotates about hinge point 72 and when lever 74 is pulled, needle 70 will pierce cartridge 64 and allow the $CO_2$ to escape into container 62. An inline pressure regulator valve 76 is needed to reduce the $CO_2$ pressure to a workable level. The container is attached to the center portion of the handlebars (not shown), preferably by a clamp (not shown).

FIG. 5 is a partial cutaway of container 16 shown in FIG. 1. A portion of the bicycle frame 14, twist off cap 19, band 18, and clamp 20 are also shown in this view. The potable liquid delivery tube 22 sealed at twist off cap 19 extends to the bottom of container 16 for when the carbonated drink is vibrated, the pressure will force almost all the liquid to the rider's mouth.

FIG. 6, a partial cutaway of the container 32 shown in FIG. 2, also shows a portion of the bicycle frame 14, twist off cap 40, band 34, and clamp 36. It is also noted that there is a potable liquid delivery tube 42, and a pressure tube 52, both sealed at the twist off cap 40. It is noted that the pressure tube extends to the top of the liquid to force the liquid down through the delivery tube 42.

FIG. 7 is a partial cutaway of a "soda pop" can 78. A flexible cap 80 is held on can 78 by a band 82 and a clamp 84. The can 78 is attached to the portion of the bicycle frame 14 by band 86 and clamp 88. A spacer 79 is around bicycle frame 14 to allow a firm attachment of band 86. In this embodiment, since a "soda pop" can holds a carbonated liquid, only a potable liquid delivery tube 90 is needed.

FIG. 8 shows a skater 92 on inline skates 94 that has a liquid dispensing apparatus worn on a belt 96. The skater 92 has a container 98 and a potable liquid delivery tube 100 which extends from the container 98 to mouthpiece 102. Attachment line 104 is held on the skater's clothing 103 by a spring biased clamp 106. When the mouthpiece 102 is not in the skater's mouth it is conveniently available to the skater 92.

FIG. 9 shows a partial cutaway of container 98 that has a flexible top 108 held on by band 110 and an clamp 112. A clip 114 which is integral with band 110 and fits over belt 96 to hold the container 98 on the skater 92.

FIG. 10 shows a mouthpiece 116 with a hand operated valve 118.

FIG. 11 shows a partial cutaway of a bite valve in a closed position. The two valve members 120 and 122 are spring biased to hold the valve in a closed position.

FIG. 12 shows a partial cutaway of a bite valve in an open position. When the two mouthpiece members 124 and 126 are forced together by the skater's teeth, the valve opens allowing the pressurized liquid to flow into the mouth. It should be noted that one of the mouthpieces shown in FIGS. 10 and 11 and 12 would be used for all embodiments of the drinking apparatus in the present invention.

FIG. 13 shows the internal details of the valve described in FIG. 10 in a closed position. FIG. 14 shows the internal details of the valve described in FIG. 10 in an open position.

Thus, it is apparent that there has been provided, in accordance with the invention, a drinking apparatus that fully satisfies the objects, aims, and advantages set forth above. While the invention has been described in conjunction with specific embodiments thereof, it is evident that many alternatives, modifications, and variations will be apparent to those skilled in the art in light of the aforegoing description. Accordingly, it is intended to embrace all such alternatives, modifications, and variations that fall within the spirit and scope of the appended claims.

What is claimed:

1. A drinking apparatus for use by a person operating a bicycle comprising:

a generally cylindrical container having a twist off cap adapted to be sealingly attached thereto and also having a carbonated drink inside said container;

a band fitted around said container, said band having a clamp, said band adapted to attach said container to a bicycle frame;

a carbonated drink delivery tube having a first end extending from the bottom of said container to a second end having a mouthpiece, said drinking tube being sealed to said twist off cap, whereby said container being attached to said bicycle frame and during a normal bicycle ride, said carbonated drink will be sufficiently disturbed to provided pressure on said carbonated drink in said container;

an attachment line having a spring biased clamp on one end adapted to be attached to a person's clothing and said attachment line connected by a loop around the carbonated drink delivery tube on the other end;

a valve inside said mouthpiece, said valve configured such that when the person bites on the mouthpiece, said valve will open and allow the pressurized carbonated drink to be ingested by the person.

2. A method of providing a drinking apparatus for use by a person operating a bicycle comprising:

providing a generally cylindrical container having a twist off cap adapted to be sealingly attached thereto and also having a carbonated drink inside said container;

attaching said cylindrical cylinder to a bicycle frame by a band, said band having a clamp;

providing a carbonated drink delivery tube adapted to extend from the bottom of said container to a mouthpiece;

sealing said carbonated drink delivery tube to said twist off cap;

attaching and sealing said delivery tube to said twist off cap, said twist off cap then being sealingly attached to said container, whereby said container being attached to said bicycle frame and during a normal bicycle ride, said carbonated drink will be sufficiently disturbed to provide pressure on said carbonated drink inside said container;

attaching a line having a spring biased clamp on one end to a person's clothing and attaching the other end of said line by a loop around said carbonated drink delivery tube;

placing a valve inside said mouthpiece, said valve being configured such that when the person bites on the mouthpiece, said valve will open and allow the pressurized carbonated drink to be ingested by the person.

* * * * *